United States Patent [19]

Calzetta

[11] 4,162,035

[45] Jul. 24, 1979

[54] HIGH RESOLUTION OPTICAL POSITION CODE DETECTOR FOR INFORMATION RECORDED ON RECORD CARRIER PARTIALLY IN HUMANLY INTELLIGIBLE FORM

[75] Inventor: Robert K. Calzetta, Cincinnati, Ohio

[73] Assignee: General Signal Corporation, Stamford, Conn.

[21] Appl. No.: 835,920

[22] Filed: Sep. 23, 1977

[51] Int. Cl.² .................. G06K 7/14; G06K 19/06; G08C 9/06

[52] U.S. Cl. .................... 235/456; 235/494; 250/555

[58] Field of Search ............... 235/455, 456, 454, 487; 35/48; 250/555, 566, 568, 569

[56] References Cited

U.S. PATENT DOCUMENTS

| | | | |
|---|---|---|---|
| 3,303,329 | 2/1967 | Fritz | 235/455 |
| 3,517,167 | 6/1970 | Bell | 235/455 |
| 3,780,270 | 12/1973 | Faulkner et al. | 235/455 |
| 3,783,246 | 1/1974 | Bayer | 235/487 |
| 3,820,068 | 6/1974 | McMillin | 235/455 |
| 3,860,794 | 1/1975 | Knockeart et al. | 235/455 |
| 3,896,295 | 7/1975 | LaPlante | 235/487 |
| 4,047,023 | 9/1977 | Key et al. | 235/455 |

*Primary Examiner*—Daryl W. Cook

*Attorney, Agent, or Firm*—Wood, Herron & Evans

[57] ABSTRACT

An optical position code detector which senses information that is recorded on a record carrier. The record carrier preferably has scan marks for synchronizing operation of the detector and at least one track with positionally encoded data marks which include one or more imprinted alphanumeric characters. The detector includes photodetectors which sense light that is reflected from the record carrier. The intensity of the reflected light varies in dependence on whether or not data marks are present and also varies due to the presence of spurious marks on the record carrier. When a scan mark appears, a comparison circuit is activated which compares the voltage from each photodetector with a reference voltage which is cycled from a low magnitude to a relatively high magnitude. The comparison circuit distinguishes data marks from spurious marks with a high resolution. A logic circuit is connected to the comparison circuit to indicate whether or not a position code is present on the record carrier. If a code validity detector which is connected to the logic circuit ascertains that a predetermined number of successive indications have been made by the logic circuit that the same position code is present, the position code is decoded to provide machine-useable information, such as to update payroll files in an attendance recorder system.

13 Claims, 3 Drawing Figures

Fig. 2

HIGH RESOLUTION OPTICAL POSITION CODE DETECTOR FOR INFORMATION RECORDED ON RECORD CARRIER PARTIALLY IN HUMANLY INTELLIGIBLE FORM

BACKGROUND OF THE INVENTION

The present invention relates to the field of automatic data handling and, more particularly, to apparatus and methods for reading information that is recorded on a record carrier. Specifically, the present invention provides apparatus and methods for detecting positionally encoded information on a record carrier, which positionally encoded information preferably includes at least one humanly intelligible character so that the record carrier is both machine-readable and humanly readable.

Various techniques exist for recording information on a record carrier. In order that information on a record carrier may be automatically processed, different types of machine-readable codes have been developed. One of the most common types of machine-readable codes is a "position code." Generally, information is recorded on a record carrier in position code format by dividing the record carrier into one or more zones, subdividing each zone into a plurality of discrete areas, and, then, by marking, punching, notching, embossing, magnetizing, or the like, particular ones of the discrete areas to encode the information. One type of position code is the familiar "two-out-of-five" position code.

Positionally encoded record carriers are utilized extensively. Illustrative of such is the familiar machine-readable test answer sheet. A desired answer is designated by marking with a dark pencil a discrete area on the test answer sheet. A machine is then employed to optically read the positionally encoded answers. It is important that the answers are accurately read. Only then is the correct test score obtained.

Unfortunately, errors are easily introduced. For example, during a test an answer may be changed by erasure of a mark in one discrete area and placement of another mark in a different discrete area. If the erasure is incomplete, a "spurious mark" can remain and cause a reading error. Moreover, unintentional marks due to dirt, smudges, etc. can also occur to constitute further sources of spurious marks. In order to insure that reading errors do not result, it is necessary to provide a reader which exhibits high resolution optical position code sensing characteristics to discriminate against spurious marks.

Generally, positionally encoded record carriers include a separate zone where the machine-readable position code, which is not readily humanly intelligible, appears in a humanly intelligible form, for example, printed alphanumeric characters, so that the information that is recorded on the record carrier in machine-readable position code is also humanly readable. On the test answer sheet, for example, each zone is labeled with a question number and each discrete area is provided with a fixed label to identify, in a humanly intelligible form, the various multiple-choice answers, e.g., "a," "b," "c," "d" or "e."

In some cases, however, variable information must be positionally encoded on a record carrier, and, therefore, fixed labels cannot be employed. In an employee attendance recorder system, for example, an employee is given a time card which he inserts in a time clock/imprinter to maintain a record of the hours which he has worked. The time card is utilized to compute the employee's pay. The time data may be positionally encoded on the time card and, therefore, machine-readable so that the employee's pay can be computed automatically by data processing equipment. Desirably, the time data is also humanly readable so that the employee can visually check the accuracy of the "in" and "out" times which are recorded on his time card. Since fixed labels cannot be employed due to the variable nature of the time data, a need exists for a technique by which variable machine-readable positionally encoded information on a record carrier, such as "in" and "out" times in an employee attendance recorder system, may be made humanly readable, for example, to enable the employee to verify the accuracy of the times recorded on his time card to assure him that his pay will be accurately computed.

SUMMARY OF THE INVENTION

The present invention provides a high resolution optical position code detector which senses information that is recorded on a record carrier in position code format in a manner which eliminates reading errors due to spurious marks. The information includes data marks, some of which in a preferred embodiment are in humanly intelligible form, such as alphanumeric characters so that the information is humanly readable as well as machine-readable. The information may also include scan marks to synchronize operation of the detector.

The data marks are preferably recorded on the record carrier in such a way that their reflective characteristics differ from that of the record and may, for example, be printed with dark-colored ink on a document having a light-colored background. The data marks are encoded such that their position on the record carrier is representative of their informational content, that is, in a positional code format.

The detector, considered in greater detail, includes an array of photodetectors which sense light that is reflected from the record carrier. The intensity of reflected light which is sensed varies in dependence on whether or not a data mark is present and also varies due to other factors including dirt or debris on the record carrier, variation in the intensity of the light source which is impinged on the record carrier, wear and deterioration of the inked data-imprinting ribbon, etc. The detector also preferably includes a photosensitive trigger circuit to sense the scan marks.

When a scan mark is sensed, the photosensitive trigger circuit activates a comparison circuit which compares the voltage from each of the photodetectors in the array with a voltage from a reference voltage circuit which successively assumes different values. In the comparison circuit, for example, the voltage from an ascending staircase generator or a ramp generator which cycles from a low magnitude reference voltage to a relatively high magnitude reference voltage is compared with the voltage from each of the photodetectors. Since the intensity of light which is reflected from a data mark differs from the intensity of light which is reflected from a spurious mark, the value at which the reference voltage exceeds the voltage from a photodetector sensing light reflected from a data mark will differ from the value at which the reference voltage exceeds the voltage from a photodetector sensing light reflected from a spurious mark. Whenever the reference voltage exceeds the voltage from one of the photodetectors in the array, the comparison circuit produces a voltage.

The comparison circuit is connected to a logic circuit. The logic circuit logically combines each voltage from the comparison circuit which, as described above, results at such time as the reference voltage exceeds an individual photodetector voltage. The logic circuit is configured to produce a voltage if and only if logical combination of the voltages from the comparison circuit indicates the presence of a provisionally valid predetermined position code, for example, a "two-out-of-six" code which requires that two and only two voltages from the comparison circuit be present. If more or less than the requisite number of voltages from the comparison circuit are present, the logic circuit does not produce a voltage.

In order to provide a desired degree of resolution in distinguishing data marks from spurious marks to eliminate reading errors, the logic circuit is connected to a code validity detector circuit. The code validity detector circuit is activated by the voltage from the logic circuit which, as described above, results at such time as the logical combination of the voltages from the comparison circuit indicates the presence of a provisionally valid predetermined position code. The code validity detector circuit produces a control voltage if and only if the logic circuit based on logical combination of the voltages from the comparison circuit indicates the presence of the same position code as the comparison circuit compares a predetermined number of successive values of the reference voltage with the voltage from each of the photodetectors. Stated differently, the code validity detector circuit produces a control voltage if and only if the comparison circuit voltages remain unchanged for a predetermined number of successive values of the reference voltage. This in turn means that there must be a required degree of resolution between data marks and any spurious marks on the record carrier. Consequently, if a spurious mark is enough like a data mark that there is insufficient resolution, the code validity detector circuit does not produce a control voltage. If sufficient resolution exists, the code validity detector circuit produces a control voltage, and the provisionally valid predetermined position code is deemed conclusively valid, and, for example, the control voltage may activate a decoder to decode the position code, thereby providing machine-useable information for input to an associated system, such as a payroll accounting system.

By distinguishing between data marks and spurious marks to make the determination of presence of a position code dependent upon a requisite degree of resolution, the present invention provides high reliability in reading information from a record carrier, and, consequently, reading errors are eliminated. Moreover, the detector is self-adjusting for detecting position codes even though imprinting of characters of information on the record carrier varies due to use of a deteriorating ink ribbon, variation in the intensity of the light which illuminates the record carrier, etc. Finally, with the detector of this invention, humanly intelligible characters can be used as one of two or more data marks of the position code so that the information on the record carrier is humanly readable as well as machine-readable. Other features and advantages of the apparatus and methods of the present invention will become apparent from a consideration of the drawing in conjunction with the description which follows.

DESCRIPTION

Figure 1:
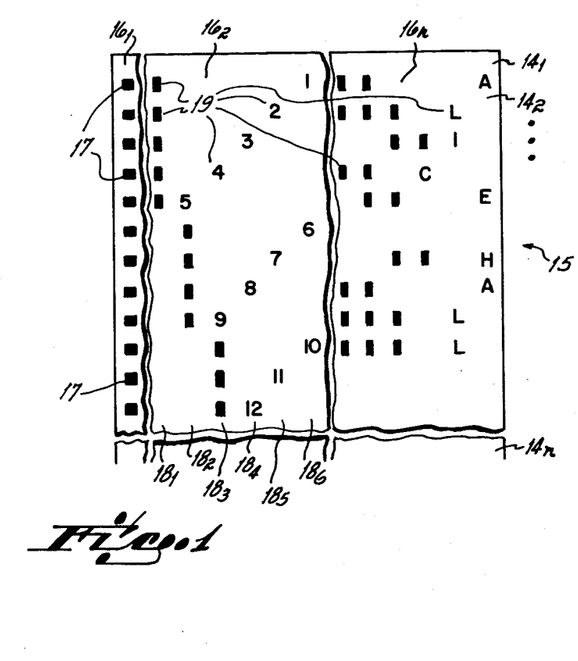
FIG. 1 illustrates a preferred form of record carrier in accordance with the present invention.

FIG. 1 shows a preferred form of a record carrier in accordance with the present invention. The record carrier, which is designated generally by the numeral 15, may comprise a document which is constructed of a material similar to that which is used to fabricate computer cards such as manila paper. The record carrier 15 is shown divided into tracks $16_1$, $16_2$, ... $16_n$.

The record carrier preferably includes a track $16_1$ having scan, or timing, marks 17. The scan marks 17 are employed to synchronize operation of the optical position code detector in FIG. 2 as will be described more fully hereinafter.

The record carrier 15 also includes at least one track with characters of information recorded thereon, such as tracks $16_2$ and $16_n$ in FIG. 1. The track $16_2$ may be employed, for example, to record hours such as on an employee time card. The track $16_2$ shows an illustrative position code format for encoding the hours "1" to "12." The track $16_n$, for example, may be employed to record the name of an employee such as "Alice Hall" as shown.

With reference to FIG. 1, the track $16_2$, for example, is subdivided into a plurality of character zones $14_1$, $14_2$, ... $14_n$ which include a plurality of channels $18_1$, $18_2$, ... $18_6$. Characters of information are encoded on the track $16_2$ by placement of data marks 19 in predetermined channels of each character zone.

As shown in FIG. 1, the data marks 19 include bar-like marks and alphanumeric characters. The bar-like marks and alphanumeric characters may be printed on the record carrier by an employee attendance recorder imprinter, for example.

The bar-like marks and alphanumeric characters which constitute the data marks 19 are encoded on the record carrier 15 by means of a position code so that the characters of information are machine-readable. As shown in the case of the track $16_2$, a "two-out-of-six" position code is employed to encode the digits "1" to "12" for illustrative purposes. The digit "1," for example, is encoded by a bar-like data mark in the channel $18_1$ and an alphanumeric character data mark in the channel $18_6$, the digit "5" is encoded by a bar-like data mark in the channel $18_1$ and an alphanumeric character data mark in the channel $18_2$, the digit "11" is encoded by a bar-like data mark in the channel $18_3$ and an alphanumeric character data mark in the channel $18_5$, etc. As can be seen in FIG. 1, the digits on the track $16_2$, while they are positionally encoded, are at the same time also humanly readable.

Figure 2:
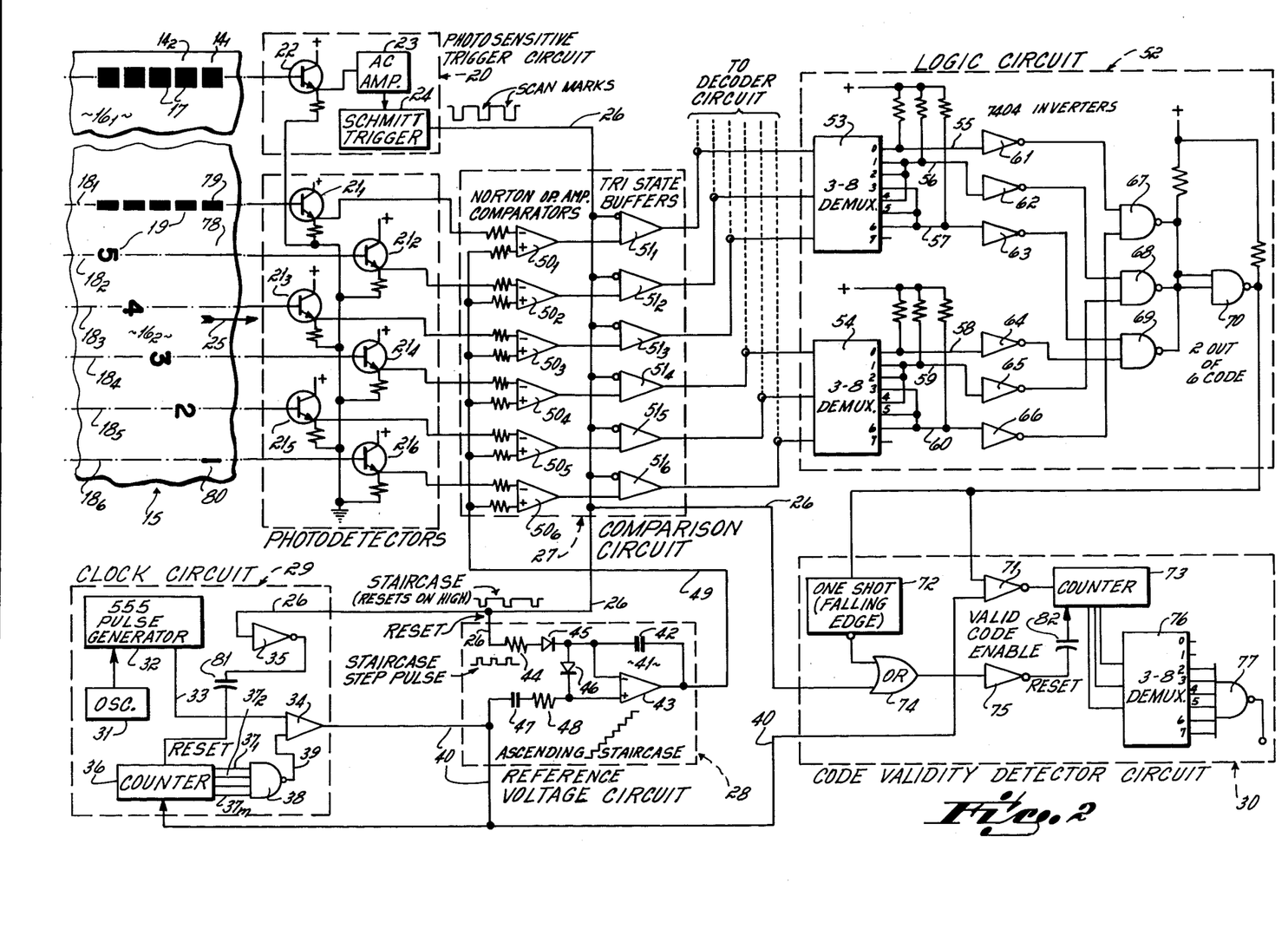
FIG. 2 is a schematic circuit diagram of an optical position code detector in accordance with the present invention.

With reference now to FIG. 2, an optical position code detector for sensing position codes on the record carrier 15 is shown in schematic circuit diagram form. A portion of the record carrier 15 in FIG. 1, specifically, the track $16_1$ and the track $16_2$, is shown in FIG. 2. A light source (not shown) emits light which impinges on the surface of the record carrier 15 on which the scan marks 17 and the data marks 19 are printed.

A photosensitive trigger circuit 20 is arranged proximate the track 16$_1$, and an array of photodetectors 21$_1$, 21$_2$, ... 21$_6$ is arranged proximate the channels 18$_1$, 18$_2$, ... 18$_6$, respectively, to sense light which is reflected from the record carrier 15. As shown in FIG. 2, the photosensitive trigger circuit 20 may include a phototransistor 22 and the photodetectors 21$_1$, 21$_2$, ... 21$_6$ may comprise phototransistors for which the collector current increases as the intensity of light reflected from the record carrier 15 increases.

The photosenstive trigger circuit 20 in addition to the phototransistor 22 includes an AC amplifier 23 which amplifies the voltage from the phototransistor 22. The AC amplifier 23 is connected to a Schmitt trigger 24.

When the record carrier 15 is inserted into the detector in FIG. 2, as indicated by the arrow 25, light initially is reflected from an unmarked portion of the record carrier 15 such that the intensity of the reflected light causes the phototransistor 22 to become forward-biased. This results in a voltage from the AC amplifier 23 which triggers the Schmitt trigger 24. The Schmitt trigger 24, therefore, assumes a logic "1" voltage level. When, however, light is later reflected from a scan mark 17 on the track 16$_1$ upon further insertion of the record carrier 15, the intensity of the reflected light decreases. This removes the forward-bias on the phototransistor 22, and, consequently, the AC amplifier 23 resets the Schmitt trigger 24 such that the Schmitt trigger 24 assumes a logic "0" voltage level.

The photosensitive trigger circuit 20 is connected by a lead 26 to four other sections of the detector in FIG. 2: a comparison circuit 27, a reference voltage circuit 28, a clock circuit 29 and a code validity detector circuit 30. These sections will be individually described below.

The clock circuit 29 includes an oscillator 31 which is connected to a pulse generator 32. The pulse generator 32 produces a series of square wave, or digital, pulses which are connected by a lead 33 to the input terminal of a tri-state buffer amplifier 34.

The Schmitt trigger 24 logic "1" voltage level that appears on the lead 26 when light is not reflected from a scan mark 17 on the track 16$_1$ normally causes an inverter 35 in the clock circuit 29 to assume a logic "0" voltage level. When, however, a scan mark 17 is sensed on the track 16$_1$ and, consequently, the Schmitt trigger 24 assumes a logic "0" voltage level which appears on the lead 26, the inverter 35 transposes from a logic "0" voltage level to a logic "1" voltage level producing a positive-going pulse via a capacitor 81 at the reset terminal of a counter 36 to reset the counter 36.

The counter 36 is a conventional m-bit binary counter so that when the counter 36 is reset the lines 37$_1$, 37$_2$, ... 37$_m$ assume a logic "0" voltage level. The lines 37$_1$, 37$_2$, ... 37$_m$ are connected to a NAND gate 38.

The NAND gate 38 assumes a logic "1" voltage level if any of the voltages on the lines 37$_1$, 37$_2$, ... 37$_m$ is at a logic "0" voltage level; and the NAND gate 38 assumes a logic "0" voltage level only if all of the voltages on the lines 37$_1$, 37$_2$, ... 37$_m$ are at a logic "1" voltage level.

The NAND gate 38 is connected to a lead 39. The lead 39 is connected to the enable terminal of the tri-state buffer amplifier 34.

When the photosensitive trigger circuit 20 resets the counter 36, the NAND gate 38 assumes a logic "1" voltage level to enable the tri-state buffer amplifier 34 for a period of m pulses from the pulse generator 32, m being equal to the number of bits of the counter 36. The tri-state buffer amplifier 34 voltage appears as a series of pulses which are connected to the counter 36 and to the reference voltage circuit 28 through a lead 40. After m pulses appear on the lead 40, the voltages on the lines 37$_1$, 37$_2$, ... 37$_m$ all assume a logic "1" voltage level such that the NAND gate 38 assumes a logic "0" voltage level to disable the tri-state buffer amplifier 34.

As shown in FIG. 2, the reference voltage circuit 28 preferably comprises an ascending staircase, or step voltage, generator which includes an analog memory, or integrator, circuit 41 that includes a storage capacitor 42 which is connected across a differential amplifier 43. The photosensitive trigger circuit 20 is connected to the inverting input of the differential amplifier 43 through the lead 26, an input resistor 44 and a diode 45. The diode 45 is connected in a polarity so that a logic "1" voltage level on the lead 26 appears at the inverting input of the differential amplifier 43 when light is not reflected from a scan mark 17 on the track 16$_1$.

The inverting input and the noninverting input of the differential amplifier 43 are interconnected by a diode 46. The diode 46 is connected in a polarity so that when a positive voltage appears at the inverting input of the differential amplifier 43 a slightly more negative voltage appears at the noninverting input of the differential amplifier 43, thereby effectively biasing the inverting input and the noninverting input of the differential amplifier 43 so as to zero, or reset, the voltage from the reference voltage circuit 28.

When, however, the Schmitt trigger 24 assumes a logic "0" voltage level when light is reflected from a scan mark 17 on the track 16$_1$, the diode 45 and the diode 46 become reverse-biased such that the series of pulses that is connected to the noninverting input of the differential amplifier 43 through the lead 40, a coupling capacitor 47 and an input resistor 48 results in a positive stepwise increasing, or ascending staircase, voltage across the storage capacitor 42 and on a lead 49 until such time as the scan mark ceases to be sensed whereupon the Schmitt trigger 24 again assumes a logic "1" voltage level and the reference voltage circuit 28 is reset.

The ascending staircase voltage from the reference voltage circuit 28 is connected by the lead 49 through input resistors to the noninverting inputs of Norton operational amplifier comparators 50$_1$, 50$_2$, ... 50$_6$ in the comparison circuit 27. The inverting inputs of the Norton operational amplifier comparators 50$_1$, 50$_2$, ... 50$_6$ are connected through input resistors to the photodetectors 21$_1$, 21$_2$, ... 21$_6$, respectively. When the ascending staircase voltage from the reference voltage circuit 28 exceeds the voltage from any of the photodetectors 21$_1$, 21$_2$, ... 21$_6$, the respective Norton operational amplifier comparator 50$_1$, 50$_2$, ... 50$_6$ assumes a logic "1" voltage level.

The Norton operational amplifier comparators 50$_1$, 50$_2$, ... 50$_6$ are connected to the input terminals of tri-state buffer amplifiers 51$_1$, 51$_2$, ... 51$_6$, respectively. The tri-state buffer amplifiers 51$_1$, 51$_2$, ... 51$_6$ have inverted enable terminals connected to the photosensitive trigger circuit 20 so that the tri-state buffer amplifiers 51$_1$, 51$_2$, ... 51$_6$ are enabled when light is reflected from a scan mark 17 on the track 16$_1$. Consequently, when a scan mark 17 on the track 16$_1$ is sensed, each of the tri-state buffer amplifiers 51$_1$, 51$_2$, ... 51$_6$ assumes a logic "1" voltage level at such time as the respective Norton operational amplifier comparator $50_1$, $50_2$, ... $50_6$ determines that the ascending staircase voltage from the reference voltage circuit 28 exceeds the voltage from the respective photodetector $21_1$, $21_2$, ... $21_6$ which is in turn dependent on the intensity of light which is reflected from each of the channels $18_1$, $18_2$, ... $18_6$ on the record carrier 15.

Since the reference voltage circuit 28 provides a finely-divided reference voltage with which to compare the voltages from the photodetectors $21_1$, $21_2$, ... $21_6$, the comparison circuit 27 closely distinguishes between data marks and spurious marks in the channels $18_1$, $18_2$, ... $18_6$ of the record carrier 15 as will become clear later. If a spurious mark is a lighter shade than a data mark, the voltage from the tri-state buffer amplifier corresponding to the channel in which the data mark appears will assume a logic "1" voltage level first. If the spurious mark is darker than the data mark, the voltage from the tri-state buffer amplifier corresponding to the channel in which the data mark appears will assume a logic "1" voltage level second. A high degree of resolution can be achieved by making the step size of the ascending staircase voltage very small, and, in fact, infinite resolution can be achieved by substituting a ramp generator in place of the ascending staircase generator, the employment of a ramp generator being contemplated in a modified form of the detector in FIG. 2.

The use of an ascending staircase or ramp voltage makes possible discrimination between position code data marks and spurious marks on the record carrier 15 except in the instance where a spurious mark corresponds exactly to a data mark. As a practical matter, this will occur relatively infrequently, as in the case of a damaged or unintelligible card. Nevertheless, if an exact correspondence occurs, the detector in FIG. 2 will indicate an invalid position code, and the record carrier 15 can then be examined by a data systems operator since the record carrier 15 bears humanly intelligible information as part of the position code. Consequently, the operator can determine the information which is recorded on the record carrier 15. The fact that the information on the record carrier 15 is humanly readable also has the advantage that if the detector in FIG. 2 requires maintenance or repair, the information on the record carrier 15 can be hand-processed as in the case where an invalid position code is indicated.

The tri-state buffer amplifiers $51_1$, $51_2$, ... $51_6$ in the comparison circuit 27 are connected to a logic circuit 52. The tri-state buffer amplifiers $51_1$, $51_2$ and $51_3$ are connected to the three binary input terminals of a 3/8 demultiplexer 53 while the tri-state buffer amplifiers $51_4$, $51_5$ and $51_6$ are connected to the three binary input terminals of a 3/8 demultiplexer 54. The 3/8 demultiplexers 53 and 54 each have output terminals which are labeled 0 to 7 in FIG. 2.

The output terminals of the 3/8 demultiplexer 53 are interconnected in such a way that if all of the tri-state buffer amplifiers $51_1$, $51_2$ and $51_3$ assume a logic "0" voltage level the output terminal 0 of the 3/8 demultiplexer 53 assumes a logic "0" voltage level which appears on a lead 55. If any one of the tri-state buffer amplifiers $51_1$, $51_2$ or $51_3$ assumes a logic "1" voltage level, the apparent binary count will be either "1", "2" or "4" such that one of the output terminals 1, 2 or 4 of the 3/8 demultiplexer 53 assumes a logic "0" voltage level which appears on a lead 56. If any two of the tri-state buffer amplifiers $51_1$, $51_2$ and $51_3$ assume a logic "1" voltage level, the apparent binary count will be either "3", "5" or "6" such that one of the output terminals 3, 5 or 6 of the 3/8 demultiplexer 53 assumes a logic "0" voltage level which appears on a lead 57.

The output terminals of the 3/8 demultiplexer 54 are similarly interconnected in such a way that if all of the tri-state buffer amplifiers $51_4$, $51_5$ and $51_6$ assume a logic "0" voltage level, a logic "0" voltage level appears on a lead 58. If any one of the tri-state buffer amplifiers $51_4$, $51_5$ or $51_6$ assumes a logic "1" voltage level, a logic "0" voltage level appears on a lead 59. If any two of the tri-state buffer amplifiers $51_4$, $51_5$ and $51_6$ assume a logic "1" voltage level, a logic "0" voltage level appears on a lead 60.

As shown in FIG. 2, the output terminals of the 3/8 demultiplexers 53 and 54 which are labeled 7 are open-circuited. A logic "0" voltage level appears on the output terminal 7 of the 3/8 demultiplexer 53 only if all three tri-state buffer amplifiers $51_1$, $51_2$ and $51_3$ assume a logic "1" voltage level. Similarly, a logic "0" voltage level appears on the output terminal 7 of the 3/8 demultiplexer 54 only if all three tri-state buffer amplifiers $51_4$, $51_5$ and $51_6$ assume a logic "1" voltage level. Since, however, a valid position code on the record carrier 15 should cause only two of the tri-state buffer amplifiers $51_1$, $51_2$, ... $51_6$ to assume a logic "1" voltage level when a two-out-of-six code is utilized as illustrated, a logic "0" voltage level on the output terminal 7 of either of the 3/8 demultiplexers 53 or 54 indicates an invalid position code.

The leads 55, 56 and 57 are connected to inverters 61, 62 and 63, respectively. Similarly, the leads 58, 59 and 60 are connected to inverters 64, 65 and 66, respectively. The inverters 61 and 66 are connected to a NAND gate 67. The inverters 62 and 65 are connected to a NAND gate 68. The inverters 63 and 64 are connected to a NAND gate 69. The NAND gates 67, 68 and 69 are connected in common to the input terminals of a NAND gate 70.

The NAND gate 70 assumes a logic "1" voltage level if any of the NAND gates 67, 68 or 69 assumes a logic "0" voltage level. One of the NAND gates 67, 68 or 69 assumes a logic "0" voltage level only if two and only two of the tri-state buffer amplifiers $51_1$, $51_2$, ... $51_6$ assume a logic "1" voltage level. This is indicative that a two-out-of-six code appears on the record carrier 15; that is, data marks appear in two and only two of the channels $18_1$, $18_2$, ... $18_6$ being sensed.

TABLE I

| Character of Information | Channels in Which Data Marks Appear | Tri-State Buffer Amps. in Logic "1" State | Output Terminals in Logic "0" State | | NAND gate in Logic "0" State |
|---|---|---|---|---|---|
| | | | Demux. 53 | Demux. 54 | |
| 1 | $18_1$, $18_6$ | $51_1$, $51_6$ | 1 | 4 | 68 |
| 2 | $18_1$, $18_5$ | $51_1$, $51_5$ | 1 | 2 | 68 |
| 3 | $18_1$, $18_4$ | $51_1$, $51_4$ | 1 | 1 | 68 |
| 4 | $18_1$, $18_3$ | $51_1$, $51_3$ | 5 | 0 | 69 |

TABLE I-continued

| Character of Information | Channels in Which Data Marks Appear | Tri-State Buffer Amps. in Logic "1" State | Output Terminals in Logic "0" State | | NAND gate in Logic "0" State |
|---|---|---|---|---|---|
| | | | ↓Demux. 53 | ↓Demux. 54 | |
| 5 | $18_1, 18_2$ | $51_1, 51_2$ | 3 | 0 | 69 |

Table I lists the states for various elements in the circuit of FIG. 2 for the digits "1" through "5" recorded on the record carrier 15 as these digits are sensed.

The NAND gate 70 is connected to the enable terminal of a tri-state buffer amplifier 71 in the code validity detector circuit 30. The NAND gate 70 is also connected to a one shot 72 whose function will be described hereinafter.

The input terminal of the tri-state buffer amplifier 71 is connected through the lead 40 to the tri-state buffer amplifier 34 in the clock circuit 29. Consequently, when the NAND gate 70 assumes a logic "1" voltage level indicative that a two-out-of-six code is present, the tri-state buffer amplifier 71 is enabled so as to pass pulses from the tri-state buffer amplifier 34 to a counter 73.

The counter 73 is reset in either of two circumstances. Each time that the photosensitive trigger circuit 20 senses a scan mark 17 on the track $16_1$, a logic "0" voltage level appears on the lead 26. Consequently, an OR gate 74 assumes a logic "0" voltage level, and an inverter 75 assumes a logic "1" voltage level producing a positive-going pulse via a capacitor 82 at the reset terminal of the counter 73 to reset the counter 73.

Also, as indicated above, the NAND gate 70 is connected to the one shot 72. The one shot 72 is connected to the OR gate 74. The function of the one shot 72 is as follows. If a two-out-of-six code appears on the record carrier 15, the NAND gate 70 in the logic circuit 52 assumes a logic "1" voltage level to hold the one shot 72 at a logic "0" voltage level. If during a reading operation, however, the NAND gate 70 transposes from a logic "1" voltage level to a logic "0" voltage level and then back to a logic "1" voltage level indicative that the detector in FIG. 2 has sensed what appears to be a first two-out-of-six code and then senses what appears to be a second two-out-of-six code, the one shot 72 is triggered so that the counter 73 is reset. The counter 73 counts the number of successive values of the ascending staircase voltage for which the logic circuit 52 indicates that the same two-out-of-six code appears on the record carrier 15. In order to provide a required degree of resolution or requisite voltage differential between the voltage from the photodetectors and the reference voltage to distinguish between data marks and spurious marks, the counter 73 is connected to a 3/8 demultiplexer 76.

The 3/8 demultiplexer 76 has output terminals which are labeled 0 to 7 in FIG. 2. As shown in FIG. 2, the terminals 2 to 7 of the 3/8 demultiplexer 76 are connected to a NAND gate 77. The NAND gate 77 produces a control voltage, or code valid for sufficient differential voltage, only if the logic circuit 52 indicates that the same two-out-of-six code appears on the record carrier 15 for at least two successive values of the ascending staircase voltage from the reference voltage circuit 28. By connection of any desired output terminals of the 3/8 demultiplexer 76 to the NAND gate 77, any desired degree of resolution may be selected.

An example of the operation will now be given to facilitate an understanding of the optical position code detector of the present invention. The example will be discussed jointly in connection with FIGS. 2 and 3.

Let is be assumed that the first character of information on the record carrier 15, that is, the digit "1" in the character zone $14_1$, is to be read. Let is also be assumed that a smudge 78 appears in the channel $18_2$ of the character zone $14_1$ on the record carrier 15. Let it further be assumed that the counter 36 is a three-bit binary counter.

Figure 3:
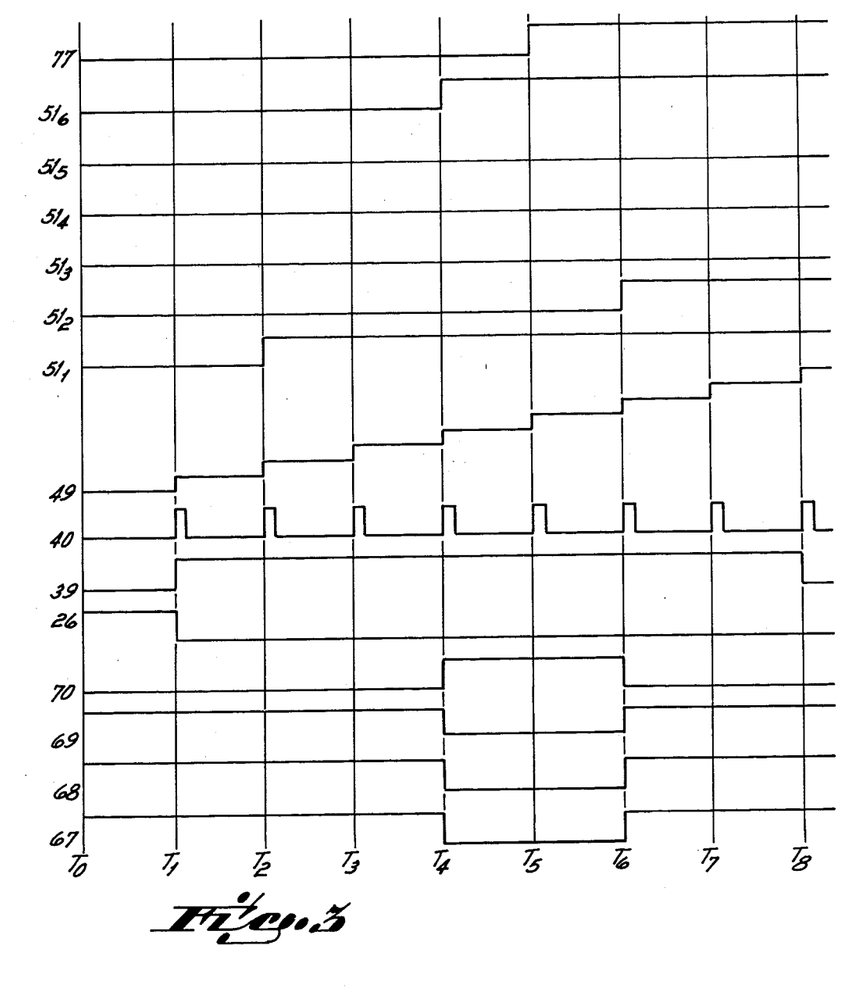
FIG. 3 is a diagram of the voltages at various loci in the circuit of FIG. 2 at times during an exemplary operation of the detector in FIG. 2.

At time $T_0$ in FIG. 3, the record carrier 15 is inserted into the detector in FIG. 2. At this time, the photosensitive trigger circuit 20 does not sense a scan mark 17 on the track $16_1$ so that the lead 26 is at a logic "1" voltage level. Consequently, the other elements of the detector in FIG. 2 have the initial conditions as shown in FIG. 3.

At time $T_1$, the photosensitive trigger circuit 20 senses a scan mark 17 on the track $16_1$. Consequently, a logic "0" voltage level appears on the lead 26 which causes the reset of the counter 36, and a logic "1" voltage level appears on the lead 39 to enable the tri-state buffer amplifier 34. The reset is also removed from the reference voltage circuit 28, the tri-state buffer amplifiers $51_1, 51_2, \ldots 51_6$ are enabled and the counter 73 is reset.

The first pulse from the pulse generator 32 at time $T_1$ produces a pulse on the lead 40 which increments the counter 36, steps the reference voltage circuit 28 to the first level of the ascending staircase voltage and is input to the tri-state buffer amplifier 71. Let it be assumed that the intensity of light which is reflected from the record carrier 15 causes the voltages from the photodetectors $21_1, 21_2, \ldots 21_6$ to exceed the first level of the ascending staircase voltage on the lead 49. Therefore, the Norton operational amplifier comparators $50_1, 50_2, \ldots 50_6$ continue to be reverse-biased by the voltage from the photodetectors $21_1, 21_2, \ldots 21_6$ such that the tri-state buffer amplifiers $51_1, 51_2, \ldots 51_6$ remain at a logic "0" voltage level as shown in FIG. 3. Consequently, the NAND gates 67, 68 and 69 remain at a logic "1" voltage level such that the NAND gate 70 remains at a logic "0" voltage level and the tri-state buffer amplifier 71 is disabled to block the pulse on the lead 40 from incrementing the counter 73.

At time $T_2$, the pulse generator 32 produces a second pulse which appears on the lead 40 to increment the counter 36 and to step the reference voltage circuit 28 to the second ascending staircase voltage level. Assume that the data mark 79 reflects so little light that the second level of the ascending staircase voltage exceeds the voltage from the photodetector $21_1$ so that the Norton operational amplifier comparator $50_1$ becomes forward-biased to trigger the tri-state buffer amplifier $51_1$ to the logic "1" voltage level. Since detection of the data mark 79 indicates only a one-out-of-six code, the elements of the logic circuit 52 whose states are shown in FIG. 3 remain in their initial condition.

At time $T_3$, the pulse generator 32 produces another pulse on the lead 40 which increments the counter 36 and steps the reference voltage circuit 28 to the third ascending staircase voltage level. This voltage continues to cause the Norton operational amplifier comparator $50_1$ to be forward-biased, but assume that it has no effect on the other Norton operational amplifier comparators $50_2$, $50_3$, ... $50_6$. Consequently, the other elements in the detector in FIG. 2 whose states are shown in FIG. 3 continue to have the same status as at time $T_2$.

The pulse generator 32 produces another pulse at time $T_4$ so as to increment the counter 36 and to step the reference voltage circuit 28 to the fourth ascending staircase voltage level. Assume that the photodetector $21_6$ voltage which is proportional to the intensity of light that is reflected from the channel $18_6$ in which the data mark 80 appears is less than the fourth level of the ascending staircase voltage such that the Norton operational amplifier comparator $50_6$ becomes forwardbiased and causes the tri-state buffer amplifier $51_6$ to assume a logic "1" voltage level.

When the tri-state buffer amplifier $51_6$ assumes a logic "1" voltage level, the output terminal 4 of the 3/8 demultiplexer 54 assumes a logic "0" voltage level, the inverter 65 assumes a logic "1" voltage level and, because the logic "1" voltage level of the tri-state buffer amplifier $51_1$ has already caused the output terminal 1 of the 3/8 demultiplexer 53 to assume a logic "0" voltage level to produce a logic "1" voltage level at the output of the inverter 62, the NAND gate 68 transposes to a logic "0" voltage level. This causes the NAND gate 70 to transpose to a logic "1" voltage level to enable the tristate buffer amplifier 71 which passes the pulse on the lead 40 to increment the counter 73.

At time $T_5$, the pulse generator 32 produces another pulse on the lead 40 which increments the counter 36 and steps the reference voltage circuit 28 to the fifth ascending staircase voltage level. Assume that the fifth level of the ascending staircase voltage does not exceed the voltage from the photodetector $21_2$ which senses the intensity of light that is reflected from the smudge 78 in the channel $18_2$. Consequently, the NAND gate 70 remains at the logic "1" voltage level to enable to the tri-state buffer amplifier 71 which passes the pulse on the lead 40 to increment the counter 73. This causes the output terminal 2 of the 3/8 demultiplexer 76 to assume a logic "0" voltage level to enable the NAND gate 77 and indicate that a valid two-out-of-six code appears on the record carrier 15.

If, however, the fifth level of the ascending staircase voltage were to exceed the voltage from the photodetector $21_2$, the tri-state buffer amplifier $51_2$ would assume a logic "1" voltage level, and the output terminal 3 of the 3/8 demultiplexer 53 would transpose to a logic "0" level to cause the inverter 63 to transpose to a logic "1" voltage level. At the same time, the output terminal 1 of the 3/8 demultiplexer 53 would transpose back to a logic "1" voltage level, and the inverter 62 would transpose to a logic "0" voltage level. As a result, the NAND gate 68 would assume a logic "1" voltage level to cause the NAND gate 70 to transpose to a logic "0" voltage level to disable the tri-state buffer amplifier 71 and block the pulse on the lead 40 from incrementing the counter 73. In this case, the two-out-of-six code represented by the data marks 79 and 80 would not be sensed with sufficient resolution over the smudge 78 to cause a control voltage to be produced by the detector in FIG. 2 since the connection of the output terminals of the 3/8 demultiplexer 76 requires that the two-out-of-six codes be sensed with a resolution equivalent to two levels of the ascending staircase voltage from the reference voltage circuit 28.

The pulse generator 32 produces another pulse at time $T_6$ so as to increment the counter 36 and to step the reference voltage circuit 28 to the sixth ascending staircase voltage level. Assume that the photodetector $21_2$ voltage which is proportional to the intensity of light that is reflected from the channel $18_2$ in which the smudge 78 appears is less than the sixth level of the ascending staircase voltage such that the Norton operational amplifier comparator $50_2$ becomes forwardbiased and causes the tri-state buffer amplifier $51_2$ to assume a logic "1" voltage level. Consequently, the output terminal 3 of the 3/8 demultiplexer 53 transposes to a logic "0" voltage level to cause the inverter 63 to transpose to a logic "1" voltage level. At the same time, the output terminal 1 of the 3/8 demultiplexer 53 transposes to a logic "1" voltage level, and the inverter 62 transposes back to a logic "0" voltage level. As a result, the NAND gate 68 assumes a logic "1" voltage level to cause the NAND gate 70 to transpose to a logic "0" voltage level to disable the tri-state buffer amplifier 71 and block the pulse on the lead 40 from incrementing the counter 73.

The states for the various elements in the detector in FIG. 2 which are shown in FIG. 3 will be the same at times $T_7$ and $T_8$ as at time $T_6$ unless the photodetector voltage which is proportional to the intensity of light that is reflected from the unmarked surface of the record carrier 15 is less than the seventh level or eighth level of the ascending staircase voltage, which for purposes of illustration will not be assumed to be the case. At time $T_8$, since the counter 36 was selected to be a three-bit binary counter, the lines 37 all assume a logic "1" voltage, and NAND gate 38 transposes to a logic "0" voltage level to disable the tri-state buffer amplifier 34 so that subsequent pulses from the pulse generator 32 are blocked. When another scan mark 17 on the track $16_1$ is sensed by the photosensitive trigger circuit 20, the reference voltage circuit 28 and the counters 36 and 73 are reset for another operation.

FIG. 2 indicates that the output of the tri-state buffer amplifiers $51_1$, $51_2$, ... $51_6$ may be connected to a decoder circuit for actual decoding of the two-out-of-six code to provide data for use by further data handling equipment. Such a decoder circuit may take any form and will not be described herein. The decoder circuit, however, may be enabled by the control voltage from the NAND gate 77 such that if the detector in FIG. 2 indicates that a two-out-of-six code is sensed with a resolution equivalent to two levels of the ascending staircase voltage from the reference voltage circuit 28 the character of information on the record carrier 15 is decoded for use by the additional data handling equipment.

Various obvious modifications in the detector in FIG. 2 can be made, such as substituting logic components like inverters and AND gates for NAND gates. The resolution of the reference voltage circuit 28 can be adjusted or a ramp voltage generator substituted therefor. The number of voltage levels of the reference voltage circuit 28 for which a two-out-of-six code must be present can be selected as desired. Other techniques besides the scan marks 17 and photosensitive trigger circuit 20 can be employed to synchronize operation. These modifications are within the scope of the present invention. Furthermore, the detector in FIG. 2 has been described in connection with detecting a two-out-of-six code, but the detector may be modified to detect the validity of any type position code.

It is also contemplated by the present invention to implement the functions of all but the photodetectors $21_1, 21_2, \ldots 21_6$ and phototransistor 22 in the photosensitive trigger circuit 20 by means of software by use of a microprocessor or programmed general purpose digital computer. This merely requires analog-to-digital converters to interface the voltages from the photodetectors $21_1, 21_2, \ldots 21_6$ and the phototransistor 22 in the photosensitive trigger circuit 20 to the microprocessor or computer.

Having fully described the invention, the following is claimed:

1. A system for detecting a position code representative of information encoded on a record carrier, comprising:
   a record carrier having at least one track, said at least one track being divided into a plurality of channels, said channels having at least one data mark recorded therein to form a position code representative of recorded information;
   transducer means associated with said channels for producing channel signals;
   a comparison circuit responsive to said channel signals for comparing each said channel signal with a reference signal cycled from a first magnitude to a second magnitude to produce an indication signal for each said channel when said reference signal bears a predetermined relation with respect to said channel signal for each said channel;
   logic circuit means for combining said indication signals for said channels to produce a validity signal in the presence of a position code representative of recorded information encoded on said record carrier; and
   a code validity detector circuit for producing a control signal when at least a predetermined number of successive validity signals is produced,
   thereby indicating that a valid position code representative of recorded information appears in said channels.

2. The system for detecting a position code representative of information encoded on a record carrier in claim 1 wherein at least one of said data marks in in humanly intelligible form.

3. The system for detecting a position code representative of information encoded on a record carrier in claim 2 wherein said humanly intelligible data mark is in the form of an alphanumeric character.

4. The system for detecting a position code representative of information encoded on a record carrier in claim 1 wherein one of said channels has a scan mark recorded therein and wherein said comparison circuit is responsive to said channel signals only when said scan mark is present.

5. A system for detecting a position code representative of information encoded on a record carrier, comprising:
   a record carrier having a first predetermined light-reflective characteristic, said record carrier being divided into at least one track, said at least one track being subdivided into a plurality of channels, said channels having at least one data mark recorded therein to form a position code representative of recorded information, at least one of said data marks being recorded in humanly intelligible form as an alphanumeric character, said data marks having a second predetermined light-reflective characteristic;
   a light source for impinging light on said record carrier;
   an array of photodetectors proximate said record carrier to receive light reflected from said record carrier, each photodetector in said array of photodetectors for producing a channel signal proportional to the intensity of light reflected from each of said channels;
   a comparison circuit connected to said array of photodetectors and responsive to said channel signals for comparing each said channel signal with a reference signal cycled from a low magnitude to a relatively high magnitude to produce an indication signal for each said channel when said reference signal bears a predetermined relation with respect to said channel signal for each said channel;
   logic circuit means connected to said comparison circuit and responsive to said indication signals for said channels for logically combining said indication signals for said channels to produce a validity signal in the presence of a position code representative of recorded information encoded on said record carrier; and
   a code validity detector circuit for producing a control signal when at least a predetermined number of successive validity signals is produced,
   thereby indicating that a position code representative of recorded information appears in said channels.

6. The system for detecting a position code representative of information encoded on a record carrier in claim 5 wherein one of said channels has a scan mark recorded therein, said scan mark having said second predetermined light-reflective characteristic, and wherein said comparison circuit is responsive to said channel signals only when said scan mark is present.

7. A method for detecting a position code representative of information encoded on a record carrier, the record carrier having at least one track, the at least one track being divided into a plurality of channels, at least one of the channels having a data mark recorded therein to form a position code representative of recorded information, including the steps of:
   transducing a characteristic of each of the channels to produce a channel signal for each of the channels;
   comparing each channel signal with a reference signal cycled from a first magnitude to a second magnitude to produce an indication signal for each channel when the reference signal bears a predetermined relation with respect to the channel signal for each channel;
   combining the indication signals for the channels to produce a validity signal in the presence of a position code representative of recorded information encoded on the record carrier;
   producing a control signal when at least a predetermined number of successive validity signals is produced,
   whereby the control signal indicates that a valid position code representative of recorded information appears in the channels.

8. The method of claim 7 for detecting a position code representative of information encoded on a record carrier wherein at least one of the data marks is in humanly intelligible form and further including the step of:
   reading the information from the record carrier.

9. The method of claim 7 for detecting a position code representative of information encoded on a record carrier wherein one of the channels has a scan mark recorded therein and wherein the step of comparing each channel signal with a reference signal cycled from a first magnitude to a second magnitude is performed only when the scan mark is detected and further including the step of:

detecting the scan mark.

10. A method for detecting a position code representative of information encoded on a record carrier, the record carrier having a first predetermined light-reflective characteristic, the record carrier being divided into at least one track, the at least one track being subdivided into a plurality of channels, at least one of the channels having a data mark recorded therein to form a position code representative of recorded information, at least one of the data marks being recorded in humanly intelligible form as an alphanumeric character, the data marks having a second predetermined light-reflective characteristic, including the steps of:

impinging light on the record carrier;

transducing a channel signal proportional to the intensity of light reflected from each of the channels;

comparing each channel signal with a reference signal cycled from a low magnitude to a relatively high magnitude to produce an indication signal for each channel when the reference signal bears a predetermined relation with respect to the channel signal for each channel;

combining the indication signals for the channels to produce a validity signal in the presence of a position code representative of recorded information encoded on the record carrier; and producing a control signal when at least a predetermined number of successive validity signals is produced, whereby the control signal indicates that a valid position code representative of recorded information appears in the channels.

11. The method of claim 10 for detecting a position code representative of information encoded on a record carrier wherein one of the channels has a scan mark recorded therein and wherein the step of comparing each channel signal with a reference signal cycled from a low magnitude to a relatively high magnitude is performed only when the scan mark is detected and further including the step of:

detecting the scan mark.

12. In a data handling system, including a record carrier and a machine for reading said record carrier, said record carrier having at least one track, said at least one track being divided into a plurality of channels, at least one of said channels being adapted to have a data mark recorded therein, the position of said data mark in said at least one channel being representative of machine-readable, positionally encoded information, the improvement comprising a record carrier having at least one data mark recorded thereon, said at least one data mark including both a mark and a separate humanly intelligible character combining to form said machine-readable, positionally encoded information, whereby said positionally encoded data mark is machine-readable and humanly readable.

13. The data handling system in claim 12 wherein said humanly intelligible character is an alphanumeric character.

* * * * *